United States Patent [19]
Marcus

[11] Patent Number: 5,647,061
[45] Date of Patent: Jul. 15, 1997

[54] HEADBAND HAVING EYEGLASS SECURING MEANS

[76] Inventor: John J. Marcus, R.D. #2 Rte. 353, Cattaraugus, N.Y. 14719

[21] Appl. No.: 638,192

[22] Filed: Apr. 26, 1996

[51] Int. Cl.⁶ ...................................................... G02C 3/02
[52] U.S. Cl. ................... 2/11; 2/DIG. 11; 2/181; 351/155
[58] Field of Search .................. 2/11, 452, DIG. 11, 2/171, 10, 918, 181, 13, 209.13; 351/155, 123, 158, 156

[56] References Cited

U.S. PATENT DOCUMENTS

| | | | |
|---|---|---|---|
| D. 325,590 | 4/1992 | Galy | D16/102 |
| 4,152,051 | 5/1979 | Van Tiem et al. | 351/59 |
| 4,179,753 | 12/1979 | Aronberg et al. | 2/209.13 |
| 4,464,797 | 8/1984 | Glassman | 351/155 |
| 4,541,125 | 9/1985 | Phillips | 351/155 |
| 4,549,793 | 10/1985 | Yoon | 351/156 |
| 4,616,367 | 10/1986 | Jean, Jr. et al. | 351/155 |
| 4,712,254 | 12/1987 | Daigle | 2/452 |
| 4,781,451 | 11/1988 | McAllen | 351/155 |
| 4,811,430 | 3/1989 | Janusz | 2/452 |
| 4,852,189 | 8/1989 | Duggan | 2/13 |
| 4,885,808 | 12/1989 | Carpenter | 2/452 |
| 5,461,727 | 10/1995 | Braswell-Moore | 2/209.13 |
| 5,491,842 | 2/1996 | Braswell-Moore | 2/10 |

FOREIGN PATENT DOCUMENTS

| 1319413 | 1/1963 | France | 2/13 |
|---|---|---|---|

*Primary Examiner*—Amy B. Vanatta
*Attorney, Agent, or Firm*—Bean, Kauffman & Snyder

[57] ABSTRACT

A flexible, perspiration-absorbing headband includes a downwardly extending flexible strip having a first end fixed to the headband and a second end end releasably attachable to the headband. The second end of the strip may be looped around a nose bridge of a pair of eyeglasses and attached to the headband to secure the eyeglasses.

1 Claim, 1 Drawing Sheet

U.S. Patent        Jul. 15, 1997        5,647,061
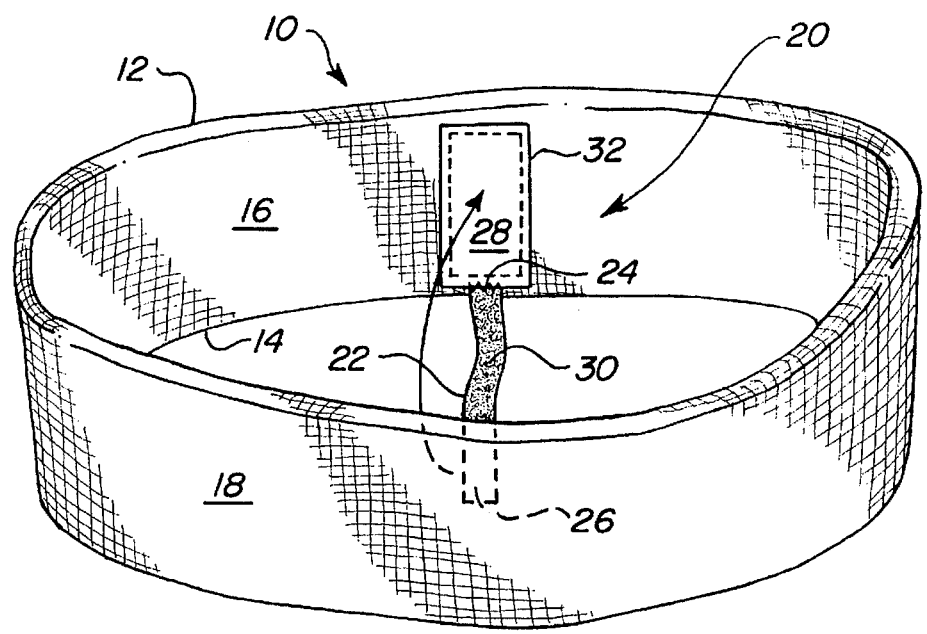
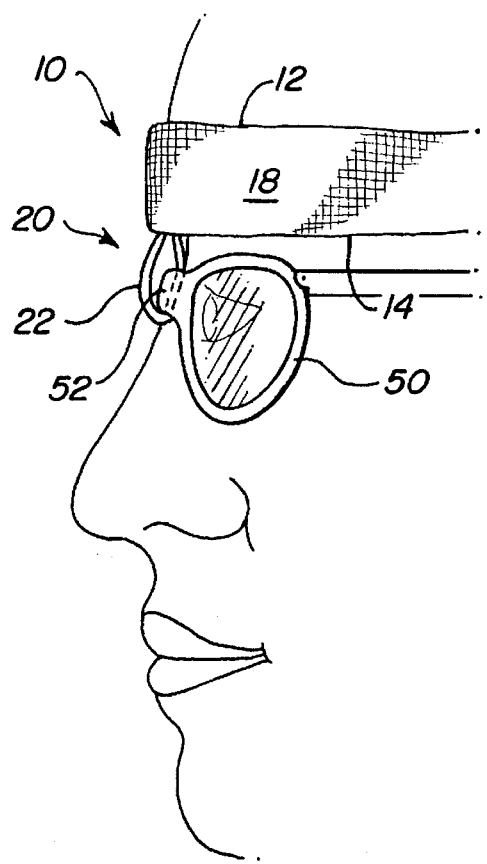
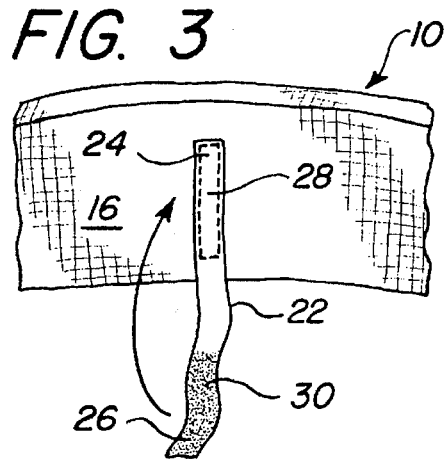
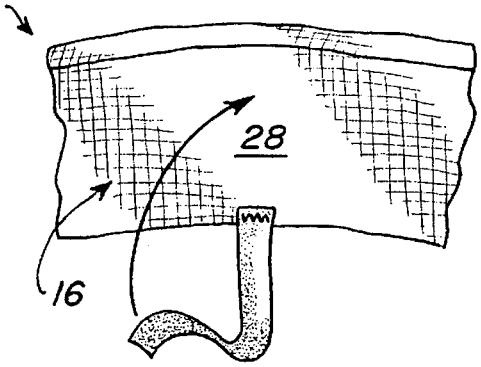

HEADBAND HAVING EYEGLASS SECURING MEANS

BACKGROUND OF THE INVENTION

A. Field of the Invention

The present invention relates generally to headbands wearable about the head of a user, and more particularly to an improved headband having a flexible strip arranged and adapted for selectively attaching a pair of eyeglasses to the headband band by looping the strip around a nose bridge of the eyeglasses.

B. Description of the Prior Art

Persons who wear eyeglasses or sunglasses for vision improvement and/or safety during strenuous activities, such as work activities involving power tools or athletic activities, often experience slippage or complete disengagement of the eyeglasses from an intended position as a result of perspiration, sadden movement of the head, or unexpected contact. Repeated slippage of the eyeglasses necessitates repeated, and often annoying, corrective manual pushing of a nose bridge of the eyeglass frame upward to reposition the eyeglasses in their intended position. Complete disengagement of the eyeglasses from their intended position can result in bending or breakage of the eyeglasses, and exposure of the wearer to unsafe risk of harmful contact of a foreign object with an eye.

Combination headband and eyeglass apparatuses are known to provide a more secure means for wearing eyeglasses. For example, U.S. Pat. No. 4,152,051 issued May 1, 1979 to Van Tiem et al. discloses a pair of eyeglasses having a headband portion adapted to encircle the head of a wearer, and an eyeglass frame removably attachable to the headband by pivot support connected to the nose bridge of the eyeglass frame and having a VELCRO-type hook pad for attachment to the headband portion. U.S. Pat. No. 4,549,793 issued Oct. 29, 1985 to Yoon teaches a headband having a pair of holder assemblies releasably attachable to the headband for holding left and right side bows of an eyeglass frame. Finally, U.S. Design Pat. No. 325,590 issued Apr. 21, 1992 to Galy discloses an ornamental design for a combined eyeglass and support headband wherein a nose bridge thereof extends upward and is integral with the headband.

The above-identified apparatuses suffer certain drawbacks. The apparatus of Van Tiem et al. requires a special eyeglass frame having a hexagonal cross-sevction nose bridge for pivotal mounting of the frame, and it requires a screwdriver for vertical adjustment of the frame. The headband of Yoon is relatively difficult to put on because the lateral support loops must be fit onto the bows of the eyeglass frame and attached by hook and catch fastener to the headband at a height which ensures proper balancing of the frame on the head of the wearer. If a loop is not properly placed, repeated detachment and reattachment of the fastener pad may be required to obtain a comfortable fit. Finally, the design of Galy must be prefit and does not allow adjustment of the position of the integrally connected eyeglass frame. Also, the headband portion of the Galy design does not appear to be an elastic material capable of absorbing perspiration.

SUMMARY OF THE INVENTION

Therefore, it is an object of the present invention to provide a headband with means for releasably attaching a pair of eyeglasses thereto which is simple to operate and which does not require the use of a tool.

It is another object of the present invention to provide a headband with means for releasably attaching a pair of eyeglasses thereto which is economical to produce.

It is a further object of the present invention to provide a headband with means for releasably attaching a pair of eyeglasses thereto which may be worn by a large percentage of the population with special size requirements for proper fit.

In accordance with the present invention, an elastic, perspiration-absorbing headband is provided with a flexible strip having a first end fixed to an inner surface of the headband near a bottom edge thereof, and the strip extending downward to terminate at a second end when the stip is unflexed. The second end of the strip includes a VELCRO hook and catch surface which is releasably and selectively attachable to a VELCRO hook and catch receiving portion associated with the inner surface of the headband adjacently above the first end of the strip. The strip is of a length suitable for looping the second end around a nose bridge of a pair of eyeglasses worn by the headband wearer and subsequently attaching the second end to the receiving portion to secure the eyeglasses against accidental or unintentional dislodgment from the face of the wearer.

BRIEF DESCRIPTION OF THE DRAWINGS

The nature and mode of operation of the present invention will now be more fully described in the following detailed description of the preferred embodiments taken with the accompanying drawing figures, in which:

FIG. 1 is a rear perspective view of an improved headband formed in accordance with a preferred embodiment of the present invention;

FIG. 2 is a view thereof as worn by a wearer;

FIG. 3 is partial view illustrating an alternative embodiment thereof; and

FIG. 4 is a partial view illustrating another alternative embodiment thereof.

DETAILED DESCRIPTION OF THE PREFERRED EMBODIMENTS

There is shown in FIGS. 1 and 2 an improved headband formed in accordance with a preferred embodiment of the present invention and designated generally by the reference numeral 10. Headband 10 is conventional in that it is a continuous band fabricated from elastic, perspiration absorbing material and comprises continuous top and bottom generally parallel edges 12 and 14 which define an inner surface 16 intended for circumferential fitting engagement with the head of a wearer and outer surface 18 opposite inner surface 16.

In accordance with the present invention, headband 10 is provided with eyeglass securing means generally identified by reference numeral 20 for selectively and releasably attaching a pair of eyeglasses 50 worn by a wearer to headband 10. In a preferred embodiment, eyeglass securing means 20 comprises a flexible VELCRO hook and catch strip 22 having a first end 24 sewn to inner surface 16 of headband 10 generally near bottom edge 14, and a second end 26 releasably attachable to a VELCRO hook and catch receiving portion 28 provided on inner surface 16 adjacently above first end 24 of strip 22. As best shown in FIG. 2, strip 22 is of a length sufficient to extend downward from headband 10, fold inward around a nose bridge 52 of eyeglasses 50, and extend upward for attachment of second end 26 to receiving portion 28, thereby forming a supporting loop around nose bridge 52. A length of approximately 2½ to 3 inches has been found suitable.

A hooked surface 30 of strip 22 is arranged to face in the same direction as inner surface 16, such that when strip 22 is folded inward as shown in FIG. 2, the hooked surface faces receiving portion 28 for attachment of second end 26 thereto. Receiving portion 28 is preferably defined by a reinforced pad 32 sewn substantially flush with inner surface 16.

FIGS. 3 and 4 illustrate alternative embodiments of the present invention wherein receiving portion 28 is defined differently than in the preferred embodiment described above. In the embodiment of FIG. 3, receiving portion 28 is integrally provided at first end 24 of strip 22, and hooked surface 30 is limited to second end 26 of strip 22, such that second end 26 is releasably attachable to first end 24. In the embodiment of FIG. 4, the material of headband 10 is of a type which is capable of receiving VELCRO-type hooks, such that second end 26 may be directly and releasably attached to headband inner surface 16.

A wearer of the present invention can quickly and easily attach eyeglasses 50 to headband 10 by looping second end 26 of strip 22 around the front of nose bridge 52 and, with headband 10 temporarily stretched away from the forehead, attaching hooked surface 30 to receiving portion 28 at a point which achieves a desired loop tightness without adversely effecting the balanced fit of eyeglasses 50. To release eyeglasses 50, second end 26 is simply pulled apart from receiving portion 28 and unlooped from around nose bridge 52. If desired, headband 10 may of course be worn without attaching a pair of eyeglasses thereto by folding second end 26 straight upward for direct attachment to receiving surface 28.

What is claimed is:

1. An improved headband comprising:

a continuous band of elastic material having an inner surface intended for circumferential fitting engagement with the head of a wearer and an outer surface opposite said inner surface, said inner and outer surfaces being defined by top and bottom edges; and eyeglass securing means for selectively attaching a pair of eyeglasses worn by said wearer to said band, said eyeglass securing means comprising an elongated strip of flexible material having a first end fixed to said band, and a second end releasably attachable to said band, said strip having a length sufficient to form a loop about a nose bridge of said eyeglasses when said second end is attached to said band, said strip including a hook and catch fastener portion at said second end, and said inner surface of said band including a hook and catch fastener receiving portion aligned above said first end for releasable attachment of said second end thereto.

* * * * *